(12) United States Patent
Yoshikawa et al.

(10) Patent No.: US 10,527,114 B2
(45) Date of Patent: Jan. 7, 2020

(54) DISC BRAKE APPARATUS

(71) Applicant: AKEBONO BRAKE INDUSTRY CO., LTD., Chuo-ku, Tokyo (JP)

(72) Inventors: Kazuhiro Yoshikawa, Tokyo (JP); Toshifumi Maehara, Tokyo (JP)

(73) Assignee: AKEBONO BRAKE INDUSTRY CO., LTD., Chuo-ku, Tokyo (JP)

( * ) Notice: Subject to any disclaimer, the term of this patent is extended or adjusted under 35 U.S.C. 154(b) by 121 days.

(21) Appl. No.: 15/569,223

(22) PCT Filed: Apr. 20, 2016

(86) PCT No.: PCT/JP2016/062573
§ 371 (c)(1),
(2) Date: Oct. 25, 2017

(87) PCT Pub. No.: WO2016/175107
PCT Pub. Date: Nov. 3, 2016

(65) Prior Publication Data
US 2018/0298962 A1   Oct. 18, 2018

(30) Foreign Application Priority Data

Apr. 27, 2015  (JP) ................................ 2015-090566
Nov. 11, 2015  (JP) ................................ 2015-221212

(51) Int. Cl.
*F16D 65/66* (2006.01)
*F16D 55/226* (2006.01)
(Continued)

(52) U.S. Cl.
CPC ....... *F16D 55/226* (2013.01); *F16D 65/0068* (2013.01); *F16D 65/02* (2013.01);
(Continued)

(58) Field of Classification Search
CPC ...... F16D 55/26; F16D 65/0068; F16D 65/18; F16D 65/66; F16D 65/567; F16D 65/683
(Continued)

(56) References Cited

U.S. PATENT DOCUMENTS 3,580,361 A   5/1971  Eggstein
3,612,226 A   10/1971 Pauwels
(Continued)

FOREIGN PATENT DOCUMENTS

CN   A-1326055    12/2001
CN   A-101660505   3/2010
(Continued)

OTHER PUBLICATIONS

Extended European Search Report dated Nov. 21, 2018 in corresponding European patent application 16786384.4 (7 pages).
(Continued)

*Primary Examiner* — Christopher P Schwartz
(74) *Attorney, Agent, or Firm* — Drinker Biddle & Reath LLP

(57) ABSTRACT

A caliper body (12) of a disc brake apparatus (10) includes an accommodating portion (14*a*) which accommodates a piston (20) for pressing a brake pad (66), a cam lever (42) for generating a pressing force through rotation, and a pressing force transmission mechanism (24) which is interposed between the piston (20) and the cam lever (42) to transmit a pressing force to the piston (20). The accommodating portion (14*a*) has an opening portion through which the piston (20), the cam lever (42) and the pressing force transmission mechanism (24) can be assembled into the caliper body (12) from a thick back side thereof, and both the accommodating portion (14*a*) and the opening portion are opened to a rotor disposition side area in the caliper body (12).

11 Claims, 7 Drawing Sheets

(51) Int. Cl.

| | | |
|---|---|---|
| *F16D 65/18* | (2006.01) | |
| *F16H 25/20* | (2006.01) | |
| *F16D 65/00* | (2006.01) | |
| *F16D 65/56* | (2006.01) | |
| *F16D 65/02* | (2006.01) | |
| *F16D 125/40* | (2012.01) | |
| *F16D 55/00* | (2006.01) | |
| *F16D 121/08* | (2012.01) | |
| *F16D 121/14* | (2012.01) | |
| *F16D 125/28* | (2012.01) | |
| *F16D 55/227* | (2006.01) | |
| *F16D 125/64* | (2012.01) | |

(52) U.S. Cl.
CPC ........... *F16D 65/18* (2013.01); *F16D 65/183* (2013.01); *F16D 65/56* (2013.01); *F16D 65/567* (2013.01); *F16H 25/20* (2013.01); F16D 55/227 (2013.01); F16D 2055/0016 (2013.01); F16D 2121/08 (2013.01); F16D 2121/14 (2013.01); F16D 2125/28 (2013.01); F16D 2125/40 (2013.01); F16D 2125/64 (2013.01)

(58) Field of Classification Search
USPC ...................................... 188/72.6–72.9, 106 F
See application file for complete search history.

(56) References Cited

U.S. PATENT DOCUMENTS

| | | | |
|---|---|---|---|
| 3,933,226 A | | 1/1976 | Maurice |
| 4,267,903 A | | 5/1981 | Kita et al. |
| 5,582,273 A | * | 12/1996 | Baumgartner .......... F16D 65/18 188/106 F |
| 6,105,734 A | | 8/2000 | Kühne et al. |
| RE38,874 E | * | 11/2005 | Bieker ................. F16D 55/226 188/71.1 |
| 7,815,021 B2 | * | 10/2010 | Baumgartner .......... F16D 65/14 188/72.7 |
| 2002/0014374 A1 | | 2/2002 | Ortegren et al. |
| 2002/0014376 A1 | | 2/2002 | Ortegren et al. |
| 2002/0017436 A1 | | 2/2002 | Ortegren et al. |
| 2002/0017437 A1 | | 2/2002 | Ortegren et al. |
| 2002/0023807 A1 | | 2/2002 | Ortegren et al. |
| 2004/0134722 A1 | | 7/2004 | Ortegren et al. |
| 2005/0258006 A1 | * | 11/2005 | Plantan ................. F16D 65/183 188/1.11 R |
| 2008/0185243 A1 | | 8/2008 | Previtali et al. |
| 2010/0320038 A1 | | 12/2010 | Hayashi et al. |
| 2013/0020153 A1 | * | 1/2013 | Moeller .............. F16D 65/0043 188/72.1 |
| 2016/0017946 A1 | * | 1/2016 | Sandberg ................ F16D 65/18 188/71.8 |

FOREIGN PATENT DOCUMENTS

| | | |
|---|---|---|
| CN | A-101929513 | 12/2010 |
| DE | A1-102012006113 | 9/2013 |
| DE | U1-202013102651 | 9/2013 |
| JP | S54-98461 A | 8/1979 |
| JP | H09-329169 A | 12/1997 |
| JP | 2001-502779 A | 2/2001 |
| JP | 2008-111551 A | 5/2008 |
| JP | 2011-80568 A | 4/2011 |
| JP | A-2011-080563 | 4/2011 |
| WO | WO-A2-2013-083857 | 6/2013 |

OTHER PUBLICATIONS

CN Office Action dated Nov. 15, 2018 in Chinese Application No. 201680024851.7 (with attached English-language translation).
International Search Report dated Jun. 28, 2016 for PCT/JP2016/062573.
International Search Report/Written Opinion dated Jun. 28, 2016 for PCT/JP2016/062573 [non-English language].
JP Office Action dated Jun. 14, 2019 from corresponding Japanese patent application No. 2015-221212 (with attached English-language translation).

* cited by examiner

DISC BRAKE APPARATUS

TECHNICAL FIELD

The present invention relates to a disc brake apparatus.

BACKGROUND ART

Technologies disclosed in Patent Literatures 1, 2 both relate to a disc brake apparatus of a type in which a pressing force with which brake pads hold a rotor is generated by rotating a cam using an air chamber as a source of power (an actuator).

As a disc brake apparatus having the mechanism described above, there are known a disc brake apparatus of a type in which a cam is disposed on a shaft and the shaft penetrates a body and a disc brake apparatus of a type in which no shaft is provided and a cam is disposed at a distal end of a lever which is rotated.

PRIOR ART LITERATURES

Patent Literatures

Patent Literature 1: JP 09-329169 A
Patent Literature 2; JP 2001-502779 A

SUMMARY OF THE INVENTION

Problem that the Invention is to Solve

Here, in a case where a cam is disposed on a camshaft, the shaft needs to be supported on a body at both ends thereof. As a result of this, a reaction force generated in generating a pressing force acts on the shaft as bending stress. Thus, there has been a problem that a greater shaft diameter is required as a higher pressing force is demanded.

In a construction in which a cam is disposed at a distal end of a lever, the form of the lever becomes complex, and a configuration is adopted in which the cam lever is incorporated in a body which is constructed so as to be divided. In a case where this configuration is adopted, there is caused a problem that the body rigidity is lowered when a pressing force is generated. Because of this, in order to complement the low rigidity, it is disclosed in the patent literature 2 that a sub-frame is provided which surrounds an outer circumference of a caliper body which straddles both side surfaces of a rotor.

An object of the invention is to provide a disc brake apparatus having a construction which can prevent a reduction in body rigidity even in a case where a cam lever is adopted for use in a servo mechanism.

Means for Solving the Problem

The object of the invention described above is attained by the following configurations.
(1) A disc brake apparatus including:
 a caliper body having a frame structure, wherein
 the caliper body includes an accommodating portion which accommodates at least:
  a piston which presses on a brake pad,
  a cam lever which generates a pressing force through rotation, and
  a pressing force transmission mechanism which is interposed between the piston and the cam lever and transmits the pressing force to the piston,
 the accommodating portion has an opening which enables the piston, the cam lever and the pressing force transmission mechanism to be assembled into the caliper body from a thick back side of the caliper body, and
 both the accommodating portion and the opening portion are opened to a rotor disposing side area of the caliper body.
(2) The disc brake apparatus according to (1) above, including:
 a pressing force generating portion cover which seals up the opening portion, wherein
 a side wall which separates the accommodating portion from the rotor disposing side area is provided on the pressing force generating portion cover, and
 a through hole through which the piston is inserted into the rotor disposing side area is provided in the side wall.

By adopting the configurations described under (1) and (2) above, the accommodating portion which is opened to facilitate the accommodation of the part to be accommodated therein and the opening portion can be sealed up and closed after the parts have been accommodated. In addition, the piston for generating the pressing force can be inserted into the rotor disposing side area.
(3) The disc brake apparatus according to (1) or (2) above, including:
 an actuator which actuates the cam lever, wherein
 the actuator includes a direct driven rod which is brought into engagement with the cam lever, and
 the actuator is an air chamber which actuates the direct driven rod by means of a force of air.

By adopting the configuration described under (3) above, the configuration of the actuator for actuating the cam lever can be simplified. In addition, since the direct driven rod is actuated by the action of the air chamber, a good responsibility is provided.
(4) The disc brake apparatus according to (1) or (2) above, including:
 an actuator which actuates the cam lever, wherein
 the actuator includes a direct driven rod which is brought into engagement with the cam lever, and
 the disc brake apparatus includes a biasing mechanism which inclines the cam lever to a brake applying side via the direct driven rod and a motor gear unit which inclines the cam lever to a brake releasing side.

By adopting the configuration described under (4) above, piping around the actuator can be eliminated. In addition, a tank for storing a hydraulic fluid and a compressor can be excluded.
(5) The disc brake apparatus according to (4) above, wherein
 the direct driven rod extends from a base of a ball screw mechanism which includes the base to be pressed against by the biasing mechanism and a ball screw to be rotated by the motor gear unit to move the base in an axial direction.

By adopting the configuration described under (5) above, by combining a rotational force of the ball screw and a reaction force by the biasing mechanism, the response in applying the brake can be enhanced.
(6) The disc brake apparatus according to (5) above, wherein
 the motor gear unit includes an electromagnetic clutch which frees a rotation of a rotational shaft of a motor.

By adopting the configuration described under (6) above, even when the supply of electric power to the motor is stopped, by actuating the electromagnetic clutch, a brake releasing state can be maintained. This can eliminate a state in which the motor is kept loaded at all times when releasing the brake.
(7) The disc brake apparatus according to any one of (1) to (6) above, wherein the cam lever has a two-pronged construction in which the cam lever straddles the pressing force transmission mechanism, and a cam portion is provided at a distal end side of each of two-pronged portions of the cam lever.

By adopting the configuration described under (7) above, the application of the pressing force to the pressing force transmission mechanism can be well balanced.

(8) The disc brake apparatus according to any one of (1) to (7) above, wherein the pressing force transmission mechanism includes an adjuster screw which adjusts a thrust position of the piston and a housing which covers the adjuster screw and receives the pressing force.

By adopting the configuration described under (8) above, even when linings of brake pads are worn, the positions of the brake pads and the housing can be adjusted only by rotating the adjuster screw.

(9) The disc brake apparatus according (8), wherein a sliding groove extending along a pressing direction of the brake pad is provided on at least a portion of the housing, and a guide bolt which is fixed to the caliper body is disposed along the sliding groove.

By adopting the configuration described under (9), the rotation of the housing can be prevented.

(10) The disc brake apparatus according to (8) or (9), wherein an automatic adjusting mechanism which performs a position adjustment by the adjuster screw using a stroke of the housing is attached to the pressing force transmission mechanism.

By adopting the configuration described under (10) above, when the linings of the brake pads are worn, the positions of the brake pads and the housing can be adjusted automatically. By doing so, an appropriate pressing force can be generated against sliding surfaces of the rotor at all times.

(11) The disc brake apparatus according to any one of (8) to (10) including (3), wherein a sliding pin is disposed between a cam portion of the cam lever and the housing.

According to the configuration described under (11) above, the sliding properties between the cam portions and the housing can be enhanced. Thus, a reduction in wear amount of the cam portions and the housing can be reduced. Thus, a material which is softer than materials from which the cam portions and the housing are formed can be used for the sliding pins, so that the wear of the sliding pins can be promoted. Parts to be replaced due to wear can be limited to the sliding pins.

Advantage of the Invention

According to the disc brake apparatus characterized as described above, even when the cam lever is adopted for use in the servo mechanism, it is possible to prevent a reduction in body rigidity. In addition, it is possible to enhance the assembling properties of the cam lever and the pressing force transmission mechanism.

MODE FOR CARRYING OUT THE INVENTION

Figure 1:
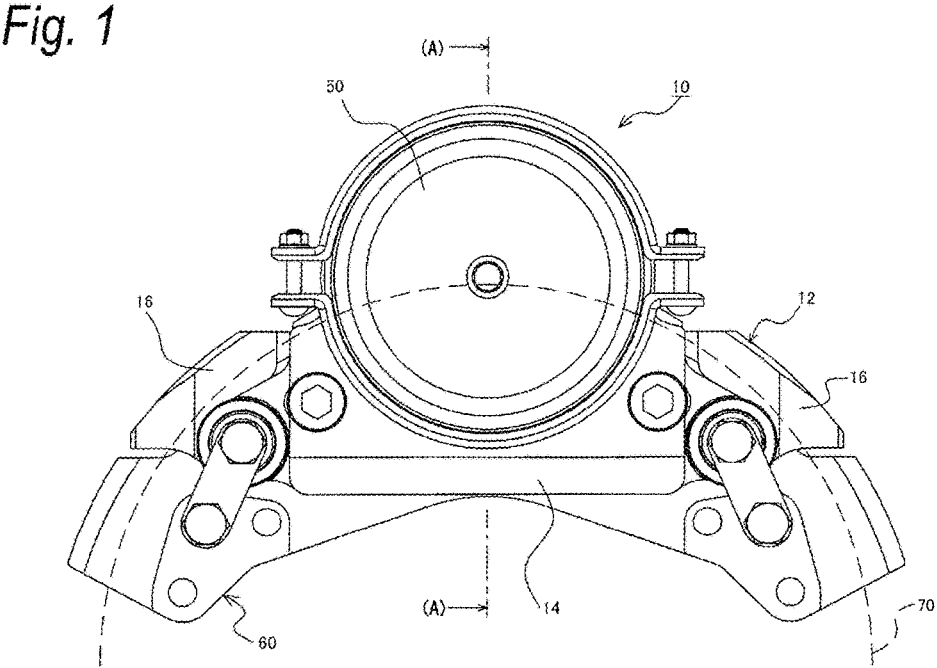
FIG. 1 is a front view showing the configuration of a disc brake apparatus according to an embodiment of the invention.
Figure 2:
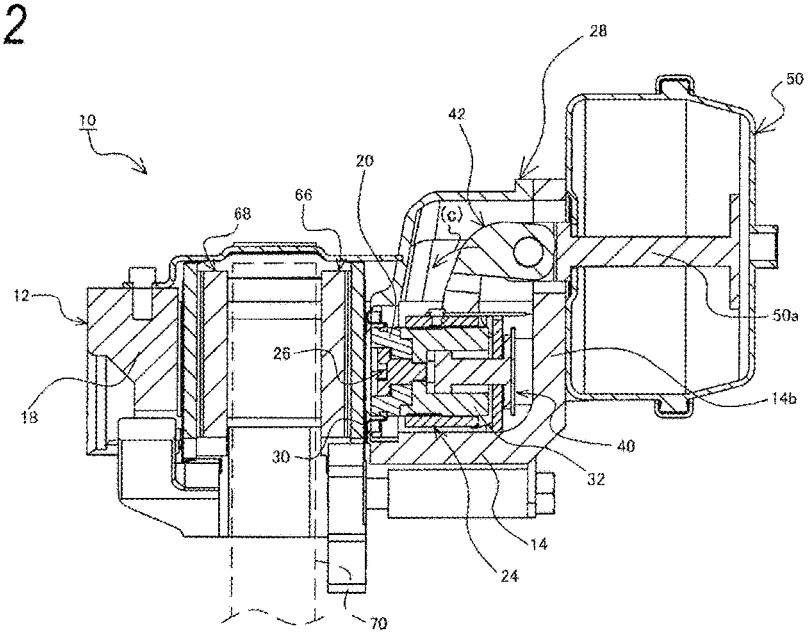
FIG. 2 is a sectional view taken along a line (A)-(A) in FIG. 1.
Figure 3:
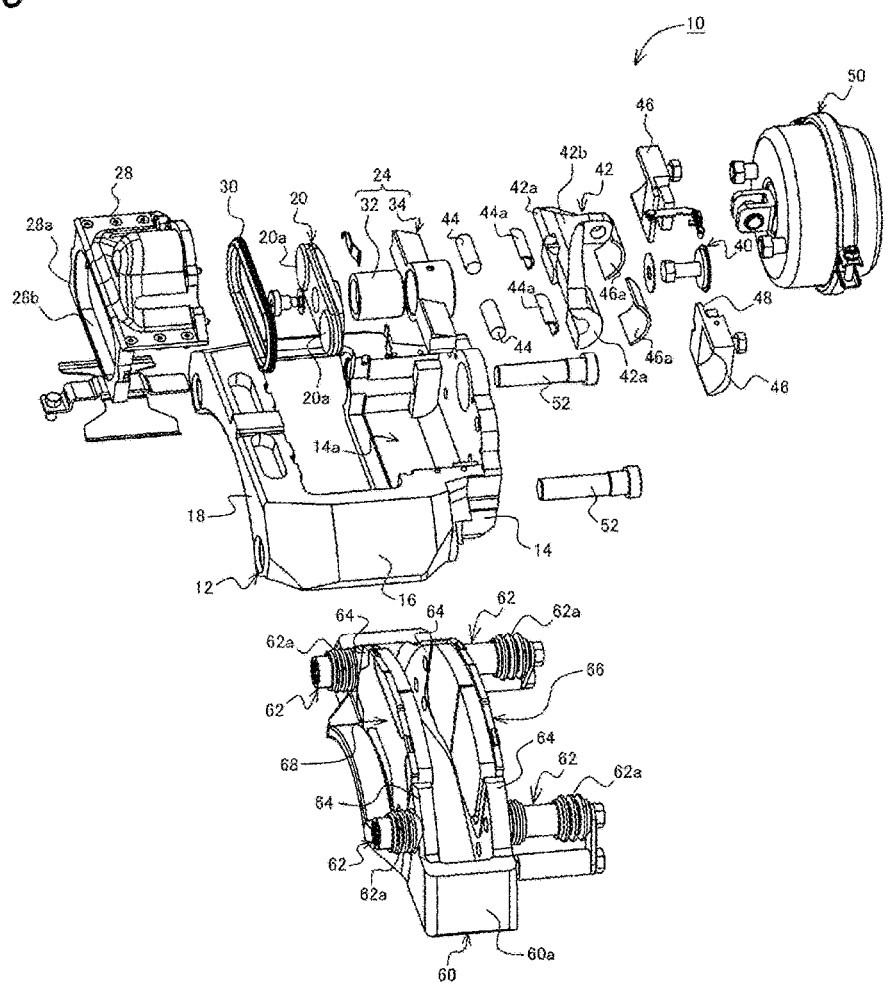
FIG. 3 is an exploded perspective view showing the configuration of the disc brake apparatus according to the embodiment.
Figure 4:
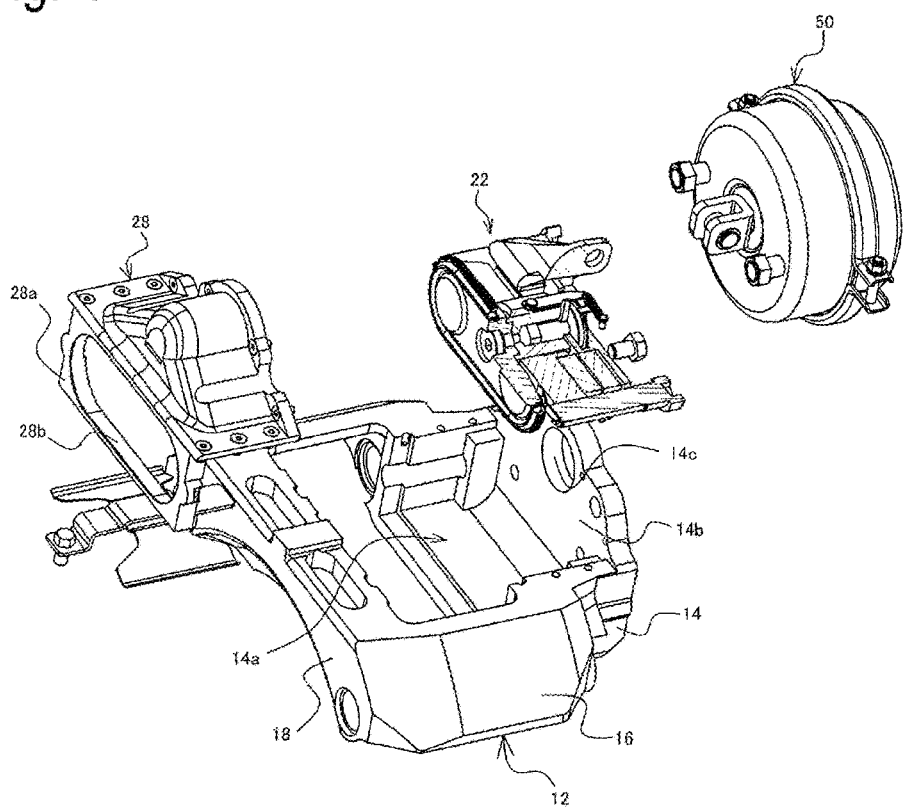
FIG. 4 is a partial exploded perspective view showing a relationship between a unitized pressing force generating mechanism and a caliper body.

Hereinafter, an embodiment of a disc brake apparatus of the invention will be described in detail by reference to the drawings. Firstly, referring to FIGS. 1 to 6, the configuration of a disc brake apparatus according to an embodiment of the invention will described.

A disc brake apparatus 10 of this embodiment basically includes a caliper body 12, a support 60 and an actuator 50, and brake pads 66, 68 are pressed against sliding surface of a rotor 70 to thereby exhibit a braking force.

The caliper body 12 basically includes a pressing force generating portion 14, a reaction force bearing portion 18 and bridge portions 16. The pressing force generating portion 14 is an element which accommodates a pressing force generating mechanism 22 including a piston 20 for generating a pressing force.

The reaction force bearing portion 18 constitutes an element which is disposed so as to be opposite to the pressing force generating portion 14 across the motor 70 and which bears a pressing force from the piston 20 when generating a pressing force. A pad holding portion for holding the brake pad 68 is provided on a surface side of the reaction force bearing portion 18 which faces the rotor 70.

The bridge portions 16 are elements which straddle an outer circumferential side of the rotor 70 to connect the pressing force generating portion 14 and the reaction force bearing portion 18 together.

In the disc brake apparatus 10 according to this embodiment, the pressing force generating portion 14, the reaction force bearing portion 18 and the bridge portions 16 make up a frame structure which is formed into a frame when seen in the top view. Because of this, it is possible to enhance rigidity against an axial tension generated by a pressure exerted by the piston 20. The pressing force generating portion 14 includes an accommodating portion 14a for accommodating the pressing force generating mechanism 22. The accommodating portion 14a includes an opening portion on a thick back side of the caliper body 12, and the pressing force generating mechanism 22 is designed to be installed through this opening portion. By adopting this construction, the assembling properties of the disc brake apparatus 10 can be enhanced.

The pressing force generating mechanism 22 includes the piston 20, a pressing force transmission mechanism 24, and a cam lever 42. In the case of this embodiment, the piston 20 has an elliptic pressing surface whose major axis extends in a circumferential direction of the motor 70 and includes two pressing portions 20a in order to ensure a balanced pressing force. A projecting portion 20b is provided at a central portion on a surface of the piston 20 which is opposite to the surface where the pressing portions 20a are provided, so that the projecting portion 20b can fit into an adjuster screw 32, which will be described in detail later. A through hole having a step portion on a surface side where the pressing portions are formed is provided in a center of the projecting portion 20b, allowing a passage of a fixing bolt 26 therethrough.

The fixing bolt 26 includes a thread portion 26a, a spacer portion 26b and a bolt head 26c. Then, portions of the fixing bolt 26 is dimensioned so that the bolt head 26c is accommodated in the step portion, the spacer portion 26b is accommodated in the through hole, and the thread portion 26a projects from the projecting portion 20b.

A boot 30 for preventing an intrusion of dust is provided between the piston 20 and a pressing force generating portion cover 28, which will be described in detail later.

The pressing force transmission mechanism 24 performs a role of transmitting a pressing force which is generated by operating a cam lever 42, which will be described in detail later, to the piston 20 described above. In the case of this embodiment, the pressing force transmission mechanism 24 includes the adjuster screw 32 and a housing 34 as main constituent elements, and an automatic adjusting mechanism 36 is attached to the pressing force transmission mechanism 24.

The adjuster screw 32 is an element for adjusting a gap which is generated when linings on the brake pads 66, 68 get worn. The adjuster screw 32 has a cylindrical shape as an external appearance and has a male thread portion on an outer circumferential surface thereof. A partition plate 32a is provided on an inner circumferential side to divide it into a pressing portion and a sliding portion. A recess portion 32b is provided on a pressing portion side of the adjuster screw 32 so that the projecting portion of the piston 20 loosely fits in the recess portion. A female thread portion 32c is provided in the partition plate 32a so that the thread portion of the fixing bolt 26 can be thread fitted in the female thread portion 32c. The female thread portion 32c may be a through hole or a blind hole as long as it has a depth which allows the fixing bolt 26 to be thread fitted in place therein. By adopting this configuration, the spacer portion 26b is brought into abutment with the partition plate 32a when the fixing bolt 26 is tightened, whereby even when rotating the adjuster screw 32, the piston 20 maintains its posture without being rotated, and the piston 20 can be made to follow a behavior of the adjuster screw 32.

Figure 5:
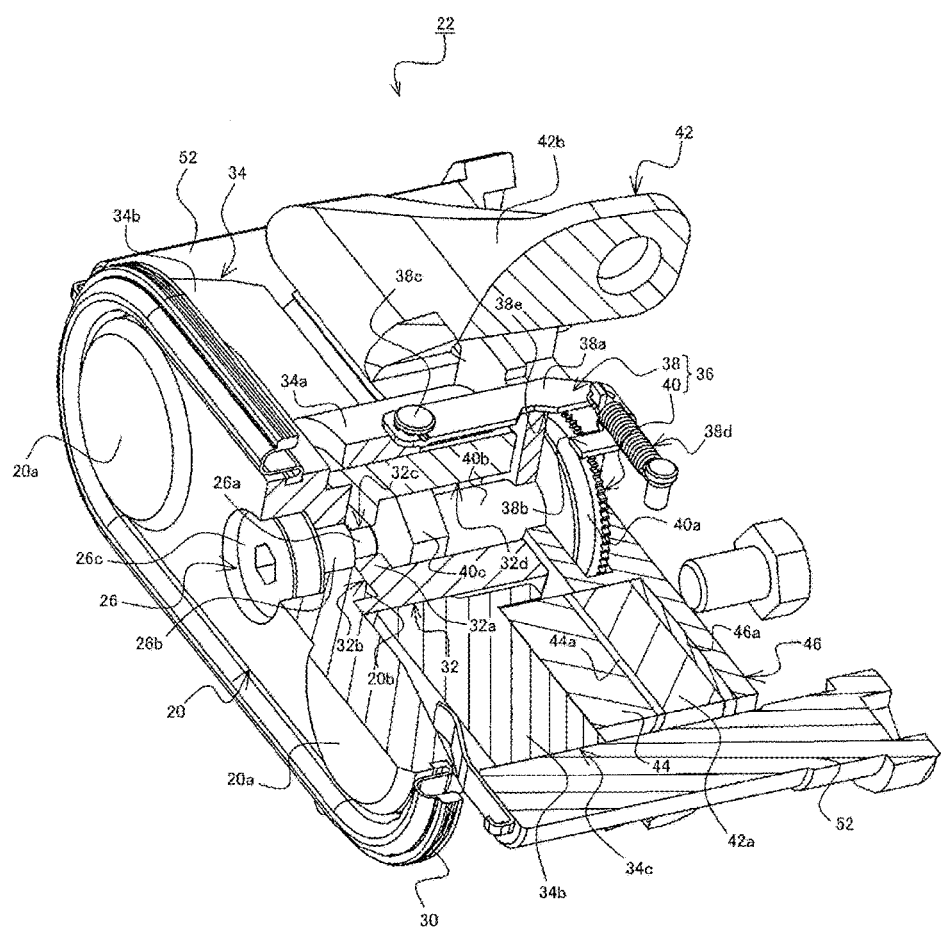
FIG. 5 is a partial exploded perspective view showing the configuration of the unitized pressing force generating mechanism.
Figure 6:
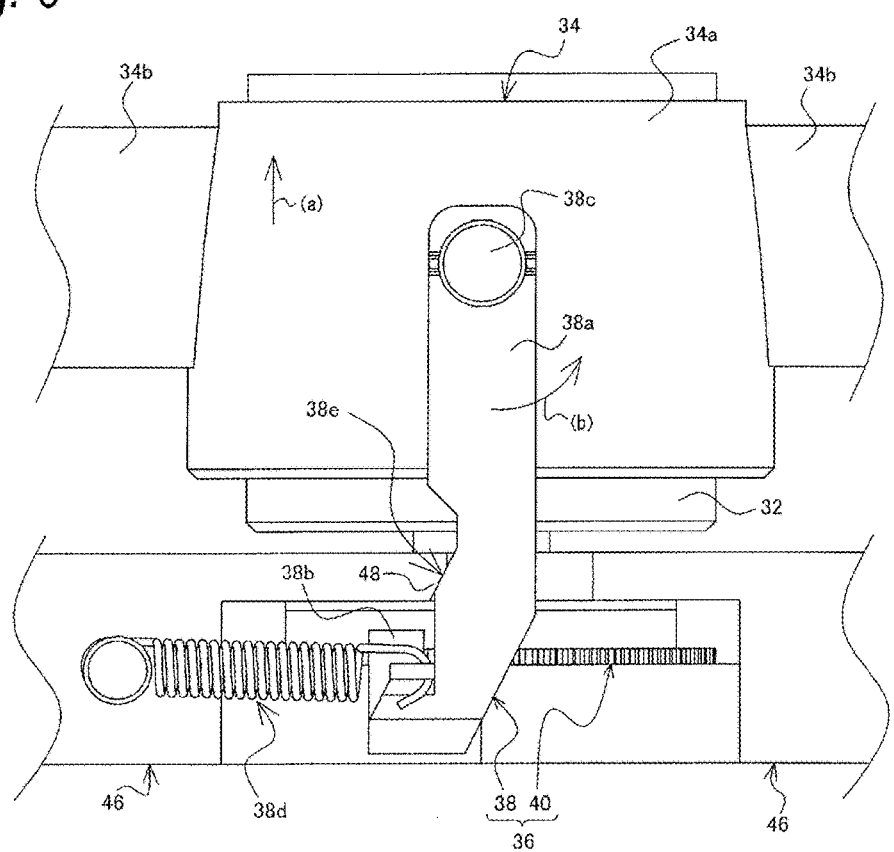
FIG. 6 is a drawing for explaining an automatic adjusting mechanism.

On the other hand, a hole 32d is provided on a sliding portion side of the adjuster screw 32, and this hole 32d is formed so that a rotational shaft 40b of an adjuster gear 40 which rotates the adjuster screw 32 is caught. In the embodiment shown in FIG. 5, the rotational shaft 40b of the adjuster gear 40, which will be described in detail later, has a hexagonal distal end shape (an engaging portion 40c). Because of this, the hole 32d may be a hole having sides which hold at least two opposite sides of the hexagonal shape. Namely, the hole 32d can have a hexagonal shape, a quadrangular shape or an elliptic shape having two parallel sides, as shown in FIG. 5.

The housing 34 includes a cylindrical portion 34a into which the adjuster screw 32 is thread fitted and pressing portions 34b to which a pressing force is applied. The cylindrical portion 34a constitutes a holder having a female thread portion on an inner circumferential surface thereof. The pressing portions 34b constitute arms which are provided on an outer circumference of the cylindrical portion 34a so as to extend therefrom. The pressing portions 34b are provided in pair so as to be disposed individually on an entrance side and an exit side of the rotor 70 which are arranged in the circumferential direction thereof with the cylindrical portion 34a acting as a base point therefor. By adopting the disposing form described above, the application of a biasing force is well balanced, thereby making it possible to prevent the pressing force transmission mechanism 24 from being prized. A sliding groove 34c extending along a pressing direction of the brake pad 66 is provided at a distal end of each of the pressing portions 34b which extend from the cylindrical portion 34a which are proximal ends thereof. The sliding grooves 34c are grooves which cause the housing 34 to slide along guide bolts 52, which will be described in detail later. By providing the sliding grooves 34c and the guide bolts 52, the housing 34 can be prevented from being rotated when adjusted. Additionally, by guiding both ends of the housing 34 in the circumferential direction of the rotor 70, it is possible to suppress the application of an unbalanced load generated by a difference in energy between the entrance side and the exit side of the rotor 70 occurring when braking to cam portions 42a of the cam lever 42.

The automatic adjusting mechanism 36 is made up basically of an adjuster lever 38 and the adjuster gear 40. The adjuster lever 38 is made up of a lever main body 38a and a hook portion 38b. The lever main body 38a constitutes a portion which not only supports the hook portion 38b but also control the behavior of the adjuster lever 38. A rotation base point 38c is provided at one end portion of the lever main body 38a and is fixed rotatably on an outer circumferential portion of the cylindrical portion 34a of the housing 34. The hook portion 38b is provided so as to continue to the other end portion of the lever main body 38a. In addition, a spring 38d for adding a tensile force to pull back the lever main body 38a which has been rotated is also attached to the other end portion of the lever main body 38a. A cam groove 38e including inclined surfaces is provided on the lever main body 38a to rotate the lever main body 38a as the housing 34 moves. A cam piece 48 which is provided at an upper end of a bush bearing 46, whose form of disposition will be described later, is brought into abutment with the cam groove 38e. Because of this, the inclined surfaces of the cam groove 38e slide along the cam piece 48 as a result of the housing 34 moving in a direction indicated by an arrow (a), and the lever main body 38a rotates in a direction indicated by an arrow (b).

The hook portion 38b is formed so as to be bent from the other end portion of the lever main body 38a in a direction in which the adjuster gear 40, which will be described in detail later, is disposed (towards a lower surface side in this embodiment) so as to mesh with teeth of the adjuster gear 40.

The adjuster gear 40 is an element for rotating the adjuster screw 32. The adjuster gear 40 includes a gear main body 40a and the rotational shaft 40b. The gear main body 40a is an element which is rotated as a result of a result of the adjuster lever 38 being operated by the hook portion 38b of the adjuster lever 38 being brought into engagement with a plurality of teeth provided on an outer circumference of a disc portion. On the other hand, the rotational shaft 40b is an element which is inserted into the hole 32d which is provided on the sliding portion side of the adjuster screw 32 so as to be brought into engagement with an inner wall of the hole 32d to thereby transmit a rotation to the adjuster screw 32. Because of this, an engagement portion 40c is provided on the rotational shaft 40 so as to be caught on the inner wall of the hole 32d. In this embodiment, the engagement portion 40c has a hexagonal cross section.

According to the automatic adjusting mechanism 36 configured in the way described above, as a result of the housing 34 moving in the direction indicated by the arrow (a) as the cam lever 42 operates, the adjuster lever 38 rotates the adjuster gear 40 to thereby push out the adjuster screw 32. When the housing 34 is pushed back as a result of the application of a pressing force by the cam lever 42 being released, the adjuster lever 38 is pulled back to its original position by means of the force of the spring 38d. Since the teeth of the adjuster gear 40 are formed into serrations, when the hook portion 38b is pulled back, the hook portion 38b slides on upper portions of the serrations without being caught. Because of this, the adjuster lever 38 is fixed in place with a vertical play given thereto.

The cam lever 42 includes the cam portions 42a and a lever portion 42b. The cam portions 42 are each made up of an arc-like curved portion, and a thickness of the curved portion is made to differ or change. By configuring the cam portions 42 in this way, a pressing force is generated in a thickness-wise direction of the curved portion by a deviation of a contact portion which is generated when the cam lever 42 is inclined. Namely, the cam lever 42 is configured as a servo mechanism which acts according to a ratio of a length of the lever portion 42b (a length from a rotation center) to a variation in thickness of the cam portion 42a to transform power from the actuator 50, which will be described in detail later, into pressing force.

The cam lever 42 includes a connecting portion with the actuator 50 at one end portion and includes the cam portions 42a described above at the other end portion. The end portion of the cam lever 42 where the cam portions 42a are disposed is two-pronged so as to straddle the cylindrical portion 34a of the housing 34 when assembled in place, and the cam portions 42a are disposed individually at ends of the two-pronged portion. As a result of the end portion of the cam lever 42 where the cam portions 42a are disposed being two-pronged, the rotational shaft 40b of the adjuster gear 40 of the automatic adjusting mechanism 36 can be inserted through a center of the caliper body 12. Additionally, as a result of the cam portions 42a being disposed on an entrance side and an exit side of the caliper body 12 which are arranged in the circumferential direction of the rotor 70, it becomes possible to generate a pressing force in a balanced fashion.

Sliding pins 44 are disposed between the pressing portions 34b of the housing 34 and the cam portions 42a of the cam lever 42. The bush bearings 46 are disposed between the cam portions 42a and an inner wall of the accommodating portion 14a. Pin bushes 44a and cam bushes 46a are provided between the sliding pins 44 and the cam portions 42a and between the cam portions 42a and the bush bearings 46, respectively, so as to enhance the sliding properties between the contact portions. As has been described before, the cam pieces 48 are formed at the upper end of the bush bearings 46 for contact with the adjuster lever 38.

A through hole 14c is provided in a side wall 14b of the accommodating portion 14a of the caliper body 12. The actuator 50 may be an air chamber or the like, for example, and a direct driven rod 50a is inserted through the through hole 14c of the accommodating portion 14a and is then assembled to the caliper body 12 in such a state that the direct driven rod 50a is connected to a distal end of the lever portion 42b of the cam leer 42. The guide bolts 52 are also assembled from an exterior of the side wall 14b so as to be fixed to the caliper body 12.

A pressing force generating portion cover 28 is provided on the opening portion of the accommodating portion 14a so as to cover the pressing force generating mechanism 22 and seal up the opening portion. The pressing force generating portion cover 28 includes a side wall which is situated on a side of the accommodating portion 14a where the rotor 70 is disposed. As a result of the pressing force generating portion cover 28 including the side wall 28a, both the accommodating portion 14a and the opening portion of the accommodating portion 14a are opened to an area where the rotor 70 is disposed (a rotor disposition side area). This can enhance the assembling properties of the part to be accommodated in the accommodating portion 14a which forms a narrow bottleneck portion. In disposing the piston 20, parts involved do not have to be inclined so as to be inserted through holes provided in the side wall. This can narrow a clearance between the side wall of the accommodating portion 14a and the parts accommodated therein. This can reduce the size of the caliper body 12 and allow the parts to be accommodated in the accommodating portion 14a in a highly compact or dense fashion. A through hole 28b is provided in the side wall 28a so that the piston 20 disposed in the accommodating portion 14a is passed therethrough into the rotor disposition side area.

The support 60 is an element for holding the caliper body 12 described above on to a vehicle or a device main body which is not shown. The support 60 includes at least guide pins 62 and an anchor portion 64. The guide pins 62 are elements for holding the caliper body 12 so as to slide freely in an axial direction of the rotor 70. In this embodiment, the guide pins 62 are disposed in pair both on a pressing force generating portion 14 side and a reaction force bearing portion 18 side of the caliper body 12 so as to correspond to the entrance side and the exit side of the rotor 70. Boots 62a are provided individually on the guide pins 62 so as to prevent the adhesion of dust to sliding portions.

The anchor portion 64 is an element for bearing energy generated in stopping the rotation of the rotor 70. In this embodiment, recess portions are provided at portions which correspond to the pressing force generating portion 14 and the reaction force bearing portion 18 which correspond, in turn, to both the main surfaces of the rotor 70, and the brake pads 66, 68 are disposed individually in the recess portions. Because of this, the support 60 includes bridge portions 60a which connect together the portions which correspond to the two main surfaces of the rotor 70.

According to the disc brake apparatus 10 configured in the way described above, the cam lever 42 is adopted as the servo mechanism, and the reduction in rigidity of the caliper body 12 can be prevented. The opening portion of the accommodating portion 14a provided in the caliper body is provided on the thick back side of the caliper body 12, whereby the pressing force generating mechanism 22 can be assembled in place in the accommodating portion 14a as a unit. This can enhance the efficiency of the assembling work. By attaching the automatic adjusting mechanism 36, even when the brake pads 66, 68 get worn, a gap generated can be narrowed automatically to thereby generate an appropriate pressing force with which the rotor 70 is held.

An operation of the disc brake apparatus 10 configured in the way described above will be described. Firstly, when air introduced into the air chamber, which is the actuator 50, and the direct driven rod 50a is then pushed out, the cam lever 42 which is connected to the direct driven rod 50a is inclined in a direction indicated by an arrow (c) about the sliding pins 44 as base points (refer to FIG. 2).

As the cam lever 42 is so inclined, the thickness of the cam portions 42a which are situated between the pressing portions 34b of the housing 34 and the bush bearings 46 shifts from thin to thick. This pushes out the sliding pins 44 by an amount corresponding to the change in thickness in the direction in which the rotor 70 is disposed to thereby generate a pressing force. When the brake pad 66 which is disposed on the pressing force generating portion 14 side of the caliper body 12 is brought into abutment with the sliding surface of the rotor 70 by means of the pressing force so generated, the caliper body 12 is caused to slide by means of a reaction force of the pressing force in a direction in which the pressing force generating portion 14 moves away from the rotor 70. This presses the brake pad 68 which is disposed on the reaction force bearing portion 18 side against the sliding surface of the rotor 70, whereby the rotor 70 is held by both of the brake pads 66, 68 therebetween.

Here, when the housing moves in the direction indicated by the arrow (a) by means of the generated pressing force (refer to FIG. 6), the adjuster screws 32 rotate by the action of the automatic adjusting mechanism 36, whereby the piston 20 is thrust towards the side where the rotor 70 is disposed.

When the introduction of air into the air chamber, which is the actuator 50, is stopped and the direct driven rod 50a is pulled back, the inclination of the cam lever 42 is also released, whereby the housing 34 is pushed back to its original position. Through this series of actions, the adjuster lever 38 of the automatic adjusting mechanism 36 is also returned to its original position by the action of the spring 38d.

In the embodiment described heretofore, the cam lever 42 is illustrated as being constructed so that the cam portions 42a are curved towards the opposite side to the side where the rotor 70 is disposed. However, even in a case where the cam portions 42a are curved towards the side where the rotor 70 is disposed, there will be no problem in causing the corn lever 42 to perform as designed. In a case where this construction is adopted, the cam portion needs to be configured so that a lower side of the cam portion forms a thin portion, while an upper side of the cam portion forms a thick portion.

In the embodiment described above, the mechanism and operation of the actuator 50 are described based on the understanding that the actuator 50 constitutes the air chamber. However, the actuator 50 may be an actuator which operates mechanically with a motor functioning as a power source. Hereinafter, referring to FIGS. 7 to 9, an embodiment will be described in which an actuator 50 is configured as a mechanical one. As to the other configurations than the actuator 50, like reference numerals will be given to elements which are like in function to those described in the embodiment in the drawings, so that a detailed description thereof will be omitted here. This is because there are imposed no specific limitations on the shapes or configurations thereof, as long as they can perform their designed functions.

Figure 7:
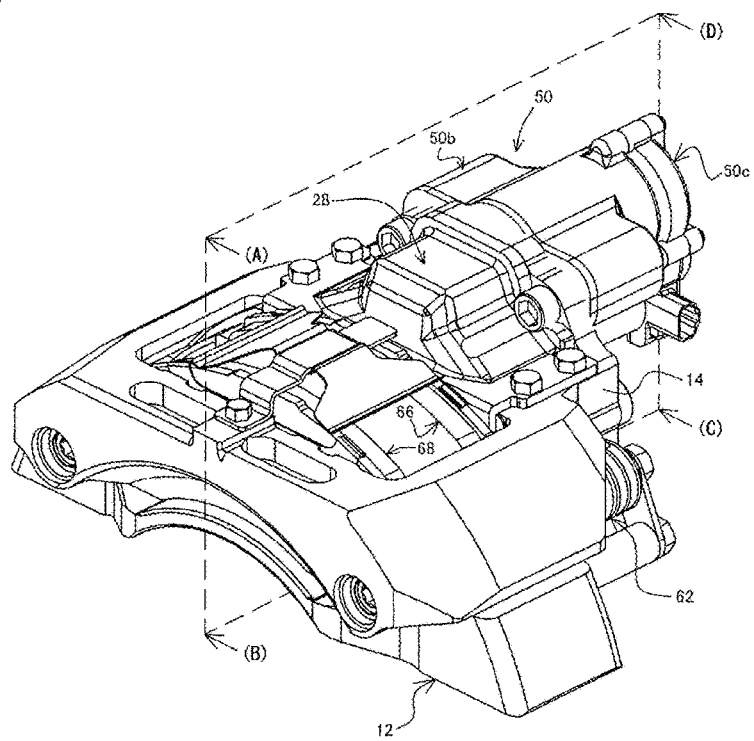
FIG. 7 is a perspective view showing the configuration of the disc brake apparatus with an actuator configured mechanically.
Figure 8:
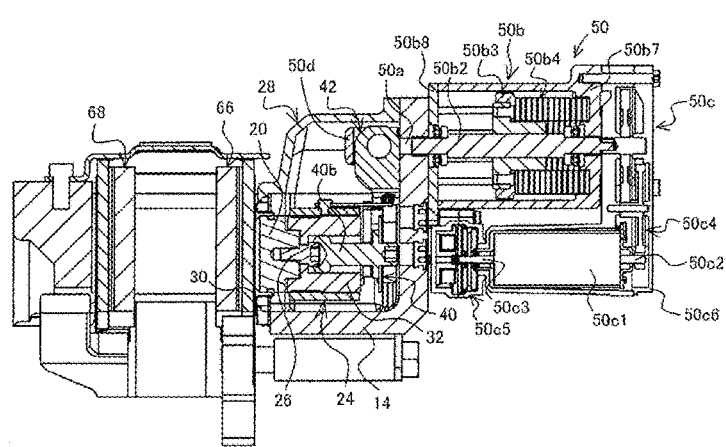
FIG. 8 is a sectional view showing a section taken on a plane (A)-(B)-(C)-(D) in FIG. 7.
Figure 9:
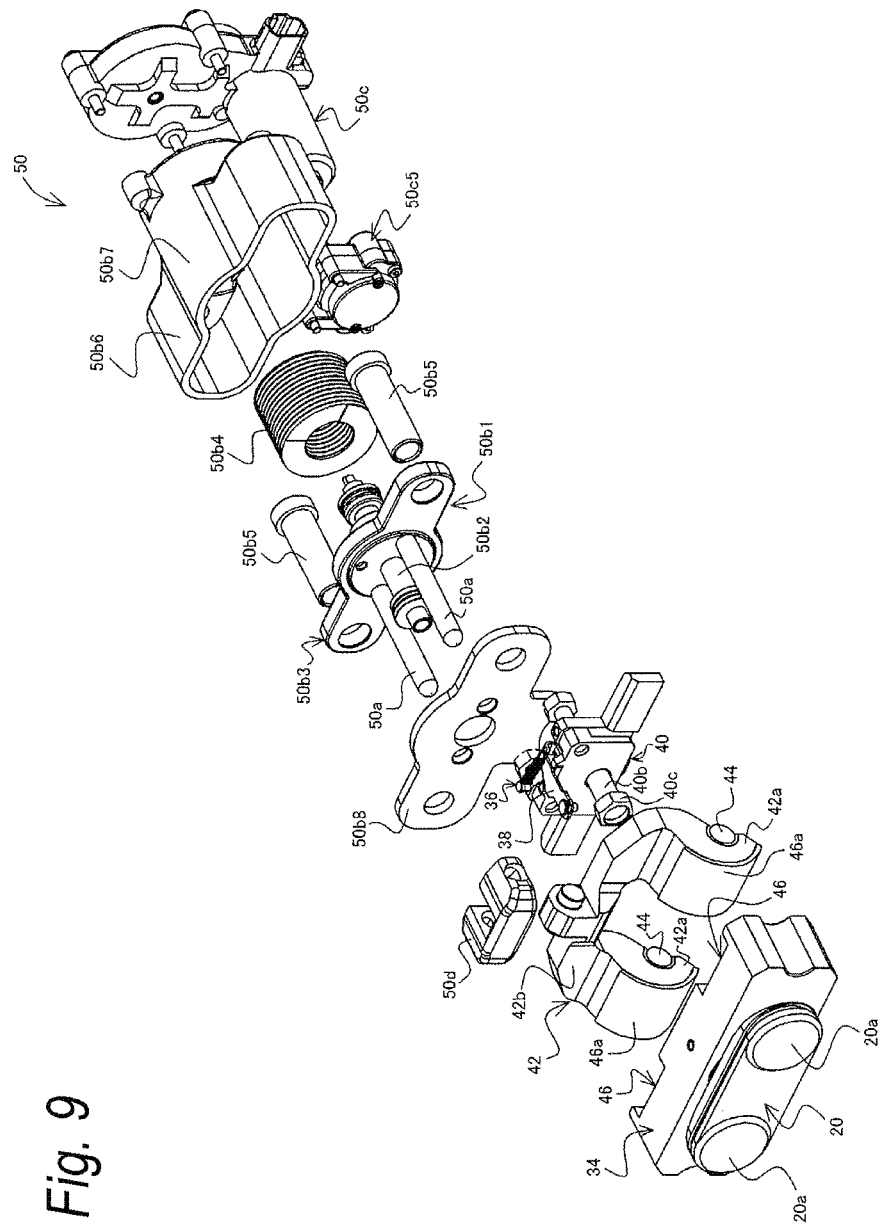
FIG. 9 is a partial exploded perspective view showing the configurations of the mechanically configured actuator and the pressing force generating mechanism.

An actuator 50 shown in FIGS. 7 to 9 (hereinafter, when a description is made by reference to the figures, FIG. 7 represents the figures referred to using an expression, expressing as "shown in FIG. 7") basically includes an operating unit 50b and a motor gear unit 50c. The operating unit 50b basically includes a ball screw mechanism 50b1, a spring 50b4, guide pins 50b5 and a housing 50b6.

The ball screw mechanism 50b1 has a ball screw 50b2, a base 50b3 which can move in an axial direction of the ball screw 50b2 and a direct driven rod 50a which is provided so as to extend from the base 50b3 as a base point in the direction of a cam lever 42. In the ball screw mechanism 50b1 configured in the way described above, when a force in a rotating direction is applied to the ball screw 50b2, the base 50b3 moves in the axial direction of the ball screw 50b2. On the other hand, when a force in the axial direction of the ball screw 50b2 is applied to the base 50b3, with the ball screw 50b2 made to rotate freely, the ball screw 50b2 rotates as the base 50b3 moves. Then, the direct driven rod 50a performs a role of pushing out or pulling in the cam lever 42 as the base 50b3 moves.

The spring 50b4 may be a coned disc spring or a coil spring, and performs a role of a biasing mechanism for generating a reaction force in the axial direction of the ball screw 50b2. In the embodiment shown in FIG. 7, the spring 50b4 is disposed so as to surround an outer circumference of the ball screw 50b2, and one end portion of the spring 50b4 is in abutment with an end face of the housing 50b6 and the other end portion of the spring 50b4 is in abutment with a main surface of the base 50b3 engaged with the ball screw 50b2.

The guide pins 50b5 are disposed along the axial direction of the ball screw 50b2 and perform a role of guiding the base 50b3 when the base 50b3 moves in the axial direction of the ball screw 50b2. In the embodiment shown in FIG. 7, the guide pins 50b5 which are fixed to the housing 50b6 are inserted through penetrating through holes formed in the base 50b3 to perform its designed function.

The housing 50b6 forms an outer shell which accommodates the ball screw mechanism 50b1, the spring 50b4 and the guide pins 50b5 and has a housing main body 50b7 which forms an accommodating portion and a housing cover 50b8 which seals up the housing main body 50b7. In the embodiment shown in FIG. 7, the housing cover 50b8 also performs a role of a bracket where the actuator 50 is fixed to a caliper body 12.

The motor gear unit 50c is a unit for rotting the ball screw 50b2 of the operating unit 50b. The motor gear unit 50c has a motor 50c1, a gear unit 50c4 and an electromagnetic clutch 50c5. The motor 50c1 provides a power source for rotating the ball screw 50b2, and in the case of the embodiment shown in FIG. 7, a double shaft motor through which a single rotational shaft penetrates is adopted. One shaft 50c2 extending by way of a body is brought into engagement with the gear unit 50c4, while the other shaft 50c3 is brought into engagement with the electromagnetic clutch 50c5.

There is imposed no specific limitation on the configuration of the gear unit 50c4. However, a configuration may be adopted in which the gear unit 50c4 includes at least a pinion gear which is brought into engagement with the shaft 50c2 of the motor 50c1 and a drive gear which is brought into engagement with the ball screw 50b2 and one or a plurality of speed reduction gears are provided between the pinion gear and the drive gear.

The electromagnetic clutch 50c5 is an element for stopping a free rotation of the rotational shaft of the motor 50c1. Thus, the electromagnetic clutch 50c5 may be configured so that the electromagnetic clutch 50c5 is in engagement with the other shaft 50c3 of the motor 50c1 so as to stop a free rotation of the rotational shaft when electric power is supplied thereto. The provision of the electromagnetic clutch 50c5 obviates the necessity of keeping the application of a load to the motor 50c1 at all times while the brake is released. The motor gear unit 50c is covered externally by the housing 50c6.

According to the motor gear unit 50c configured in the way described above, the ball screw 50b2 is rotated by driving the motor 50c1, and the base 50b3 is drawn towards the gear unit 50c4 (that is, in a direction in which the spring 50b4 is compressed). On the other hand, when the supply of electric power to the motor 50c1 is stopped, the rotational shaft of the motor 50c1 becomes free to rotate. The spring 50b4 which is compressed by the rotation of the ball screw 50b2 generates a reaction force between the base 50b3 and the housing 50b6 to thereby generate a force with which the base 50b3 is pushed back in a direction in which the base 50b3 is moved away from the gear unit 50c4. The rotational shaft of the motor 50c1 becomes free to rotate, and a resisting force against a spring-back force of the spring 50b4 is small. Because of this, the base 50b3 moves in the direction in which it moves away from the gear unit 50c4 while rotating reversely the ball screw 50b2.

Here, when the electromagnetic clutch 50c5 is actuated with the spring 50b4 compressed, the free rotation of the rotational shaft of the motor 50c1 is interrupted. Because of this, even when the supply of electric power to the motor 50c1 is stopped, there is no risk of the base 50b3 being pushed back.

In the embodiment shown in FIG. 7, the cam lever 42 and the direct driven rod 50a are described as being connected together via a connecting member 50d. In a case where the actuator 50 is configured like this, with both the motor 50c1 and the electromagnetic clutch 50c5 staying in an inoperable state, the base 50b3 is pressed in a direction in which the base 50b3 moves away from the gear unit 50c4 by means of the force of the spring 50b4. In this state, the cam lever 42 connected to the direct driven rod 50a which extends from the base 50b3 is inclined in a direction in which the brake is actuated.

In contrast with this, when the motor 50c1 is driven, the ball screw 50b2 is rotated, and the base 50b3 moves in such a way as to be drawn towards the gear unit 50c4. This pulls back the cam lever 42 in a direction in which the brake is released. By actuating the electromagnetic clutch 50c5 in this state, even when the supply of electric power to the motor 50c1 is stopped, the brake can be held released.

When the brake is applied from the state where the brake is released, the electromagnetic clutch 50c5 is released, and the motor 50c1 is actuated to rotate reversely to the direction in which the spring 50b4 is compressed, whereby a time spent until the brake is actuated can be shortened, thereby making it possible to realize an improved response.

Even when the actuator 50 is configured in the way described above, the same working effects as those provided by the disc brake apparatus 10 according to the embodiment can be obtained.

Here, the characteristics of the embodiments of the disc brake apparatus according to the invention will be summarized as below on an item-by-item basis.

[0] A disc brake apparatus (10) including:
a caliper body (12) having a frame structure, wherein the caliper body includes an accommodating portion (14a) which accommodates at least:
a piston (20) which presses on a brake pad (66, 68),
a cam lever (42) which generates a pressing force through rotation, and
a pressing force transmission mechanism (24) which is interposed between the piston and the cam lever and transmits the pressing force to the piston, the accommodating portion has an opening which enables the piston, the cam lever and the pressing force transmission mechanism to be assembled into the caliper body from a thick back side of the caliper body, and
both the accommodating portion and the opening portion are opened to a rotor disposing side area of the caliper body.
[2] The disc brake apparatus (10) according to [1] above, including:
a pressing force generating portion cover (28) which seals up the opening portion, wherein
a side wall (14b) which separates the accommodating portion from the rotor disposing side area is provided on the pressing force generating portion cover, and
a through hole (14c) through which the piston is inserted into the rotor disposing side area is provided in the side wall.
[3] The disc brake apparatus according to [1] or [2] above, including:
an actuator (50) which actuates the cam lever, wherein
the actuator includes a direct driven rod (50a) which is brought into engagement with the cam lever, and
the actuator is an air chamber which actuates the direct driven rod by means of a force of air.
[4] The disc brake apparatus according to [1] or [2] above, including:
an actuator which actuates the cam lever, wherein
the actuator includes a direct driven rod which is brought into engagement with the cam lever, and
the disc brake apparatus includes a biasing mechanism (a spring 50b4) which inclines the cam lever to a brake applying side via the direct driven rod and a motor gear unit (50c) which inclines the cam lever to a brake releasing side.
[5] The disc brake apparatus according to [4] above, wherein
the direct driven rod extends from a base (50b3) of a ball screw mechanism (50b1) which includes the base (50b3) to be pressed against by the biasing mechanism and a ball screw (50b2) to be rotated by the motor gear unit to move the base in an axial direction.
[6] The disc brake apparatus according to [5] above, wherein
the motor gear unit includes an electromagnetic clutch (50c5) which frees a rotation of a rotational shaft (the other shaft 50c3) of a motor (50c1).
[7] The disc brake apparatus according to any one of [1] to [6] above, wherein
the cam lever (42) has a two-pronged construction in which the cam lever straddles the pressing force transmission mechanism, and
a cam portion (42a) is provided at a distal end side of each of two-pronged portions of the cam lever (42).
[8] The disc brake apparatus according to any one of [1] to [7] above, wherein
the pressing force transmission mechanism includes an adjuster screw (32) which adjustes a thrust position of the piston and a housing (34) which covers the adjuster screw and receives the pressing force.
[9] The disc brake apparatus according [8], wherein
a sliding groove (34c) extending along a pressing direction of the brake pad is provided on at least a portion of the housing, and
a guide bolt (52) which is fixed to the caliper body is disposed along the sliding groove.
[10] The disc brake apparatus according to [8] or [9], wherein
an automatic adjusting mechanism (36) which performs a position adjustment by the adjuster screw using a stroke of the housing is attached to the pressing force transmission mechanism (24).

[11] The disc brake apparatus according to any one of [8] to [10] including [3], wherein
a sliding pin (44) is disposed between a cam portion of the cam lever and the housing.

The invention is not limited to the embodiments that have been described heretofore and hence can be modified or improved as required. In addition, the materials, shapes or configurations, dimensions, numbers and locations of the constituent elements described in the embodiments are arbitrary and are not limited thereto, as long as the invention can be attained.

In addition, this patent application is based on Japanese Patent Application (No. 2015-090566) filed on Apr. 27, 2015 and Japanese Patent Application (No. 2015-221212) filed on Nov. 11, 2015, the contents of which are incorporated herein by reference.

INDUSTRIAL APPLICABILITY

According to the disc brake system of the invention, even when the cam lever is adopted for use in the servo mechanism, it is possible to prevent a reduction in body rigidity. Additionally, it is possible to provide the disc brake apparatus which enhances the efficiency of the assembling work of the cam lever and the pressing force transmission mechanism.

DESCRIPTION OF REFERENCE NUMERALS 10 disc brake apparatus; 12 caliper body; 14 pressing force generating portion; 14a accommodating portion; 14b side wall; 14c through hole; 16 bridge portion; 18 reaction force bearing portion; 20 piston; 20a pressing portion; 20b projecting portion; 22 pressing force generating mechanism; 24 pressing force transmission mechanism; 26 fixing bolt; 26a thread portion; 20b spacer portion; 26c bolt head; 28 pressing force generating portion cover; 28a side wall; 28b through hole; 30 boot; 32 adjuster screw; 32a partition plate; 32b recess portion; 32c female thread portion; 32d hole; 34 housing; 34a cylindrical portion; 34b pressing portion; 34c sliding groove; 36 automatic adjusting mechanism; 38 adjuster lever; 38a lever main body; 38b hook portion; 38c rotational base point; 38d spring; 38e cam groove; 40 adjuster gear; 40a gear main body; 40b rotational shaft; 40c engaging portion; 42 cam lever; 42a cam portion; 42b lever portion; 44 sliding pin; 44a pin bush; 46 bush bearing; 46a cam bush; 48 cam piece; 50 actuator; 50a direct driven rod; 50b operating unit; 50b1 ball screw mechanism; 50b2 ball screw; 50b3 base; 50b4 spring; 50b5 guide pin; 50b6 housing; 50b7 housing main body; 50b8 housing cover; 50c motor gear unit; 50c1 motor; 50c2 one shaft; 50c3 the other shaft; 50c4 gear unit; 50c5 electromagnetic clutch; 50c6 housing; 50d connecting member; 52 guide bolt; 60 support; 60a bridge portion; 62 guide pin; 62a boot; 64 anchor portion; 66, 68 brake pad; 70 rotor.

The invention claimed is:

1. A disc brake apparatus comprising:
a caliper body having a frame structure, and being configured to be attached with a rotor, wherein
the caliper body is comprised of pressing force generating portion, a reaction force bearing portion disposed opposite the pressing force generating portion across from the rotor, and bridge portions that bridge over the rotor to connect the pressing force generating portion and the reaction force bearing portion,
the pressing force generating portion, the reaction force bearing portion, and the bridge portions constitute the frame structure of the caliper body and define an opening portion of the frame structure,
the pressing force generating portion includes an accommodating portion and a side wall,
the bridge portions and the side wall of the pressing force generating portion define the accommodating portion,
the accommodating portion accommodates a pressing force generating mechanism assembled as a unit,
the pressing force generating mechanism includes at least:
a piston which presses on a break pad,
a cam lever which generates a pressing force through rotation, and
a pressing force transmission mechanism which is interposed between the piston and the cam lever and transmits the pressing force to the piston,
the frame structure of the caliper body is configured such that the pressing force generating mechanism in which the piston, the cam lever, and the pressing force transmission mechanism are assembled as the unit is attachable to the accommodating portion through the opening portion, and
the accommodating portion is opened to a rotor disposing side area where the rotor is disposed in the caliper body.

2. The disc brake apparatus according to claim 1, comprising:
a pressing force generating portion cover that covers the accommodating portion, wherein
a side wall which separates the accommodating portion from the rotor disposing side area is provided on the pressing force generating portion cover, and
a through hole through which the piston is inserted into the rotor disposing side area is provided in the side wall.

3. The disc brake apparatus according to claim 1, comprising:
an actuator which actuates the cam lever, wherein
the actuator includes a direct driven rod which is brought into engagement with the cam lever, and
the actuator is an air chamber which actuates the direct driven rod by means of a force of air.

4. The disc brake apparatus according to claim 1, comprising:
an actuator which actuates the cam lever, wherein
the actuator includes a direct driven rod which is brought into engagement with the cam lever, and
the disc brake apparatus includes a biasing mechanism which inclines the cam lever to a brake applying side via the direct driven rod and a motor gear unit which inclines the cam lever to a brake releasing side.

5. The disc brake apparatus according to claim 4, wherein
the direct driven rod extends from a base of a ball screw mechanism which includes the base to be pressed against by the biasing mechanism and a ball screw to be rotated by the motor gear unit to move the base in an axial direction.

6. The disc brake apparatus according to claim 5, wherein
the motor gear unit includes an electromagnetic clutch which frees a rotation of a rotational shaft of a motor.

7. The disc brake apparatus according to claim 1, wherein
the cam lever has a two-pronged construction in which the cam lever straddles the pressing force transmission mechanism, and
a cam portion is provided at a distal end side of each of two-pronged portions of the cam lever.

8. The disc brake apparatus according to claim 1, wherein
the pressing force transmission mechanism includes an adjuster screw which adjusts a thrust position of the piston and a housing which covers the adjuster screw and receives the pressing force.

9. The disc brake apparatus according to claim 8, wherein
a sliding groove extending along a pressing direction of the brake pad is provided on at least a portion of the housing, and
a guide bolt which is fixed to the caliper body is disposed along the sliding groove.

10. The disc brake apparatus according to claim 8, wherein
an automatic adjusting mechanism which performs a position adjustment by the adjuster screw using a stroke of the housing is attached to the pressing force transmission mechanism.

11. The disc brake apparatus according to claim 8, wherein
a sliding pin is disposed between a cam portion of the cam lever and the housing.

* * * * *